(12) United States Patent
Howe

(10) Patent No.: US 8,996,551 B2
(45) Date of Patent: Mar. 31, 2015

(54) MANAGING GEOGRAPHIC REGION INFORMATION

(71) Applicant: Longsand Limited, Cambridge (GB)

(72) Inventor: James Howe, Cambridge (GB)

(73) Assignee: Longsand Limited (GB)

( * ) Notice: Subject to any disclaimer, the term of this patent is extended or adjusted under 35 U.S.C. 154(b) by 73 days.

(21) Appl. No.: 13/632,807

(22) Filed: Oct. 1, 2012

(65) Prior Publication Data

US 2014/0095497 A1  Apr. 3, 2014

(51) Int. Cl.
*G06F 7/00* (2006.01)
*G06F 17/30* (2006.01)

(52) U.S. Cl.
CPC .............. *G06F 17/30241* (2013.01)
USPC ..................................... 707/758

(58) Field of Classification Search
None
See application file for complete search history.

(56) References Cited

U.S. PATENT DOCUMENTS

| | | | |
|---|---|---|---|
| 7,487,040 B2 * | 2/2009 | Catalinotto | 701/409 |
| 7,848,764 B2 | 12/2010 | Riise et al. | |
| 8,019,532 B2 | 9/2011 | Sheha et al. | |
| 8,050,689 B2 * | 11/2011 | Riise et al. | 455/456.1 |
| 2003/0134648 A1 * | 7/2003 | Reed et al. | 455/456 |
| 2004/0024720 A1 * | 2/2004 | Fairweather | 706/46 |
| 2004/0128215 A1 * | 7/2004 | Florance et al. | 705/28 |
| 2007/0050340 A1 * | 3/2007 | von Kaenel et al. | 707/3 |
| 2007/0135992 A1 * | 6/2007 | Riise et al. | 701/207 |
| 2009/0132469 A1 * | 5/2009 | White et al. | 707/2 |
| 2012/0066066 A1 | 3/2012 | Jain et al. | |
| 2012/0208558 A1 * | 8/2012 | Bajko et al. | 455/456.1 |
| 2013/0013094 A1 * | 1/2013 | Parks et al. | 700/92 |

OTHER PUBLICATIONS

Hermann, S.D. et al; "Investigation of Geographical Routing Enhancements for Location Based Push Services"; Sep. 2006; 8 pages. <http://www2.tkn.tu-berlin.de/publications/papers/hermann_eunice06.pdf>.

Song, W. et al.; "Polygon Simplification for Location-based Services Using Population Density"; 2011; 6 pages. < http://www1.cs.columbia.edu/~hgs/papers/Song1106_Polygon.pdf >.

* cited by examiner

*Primary Examiner* — Robert Beausoliel, Jr.
*Assistant Examiner* — Nicholas Allen
(74) *Attorney, Agent, or Firm* — Mannava & Kang, P.C.

(57) ABSTRACT

In an implementation, geographic region information is managed through storage, in a database, of respective sets of coordinates of elements and region identifiers of a plurality of geographic regions that are mapped onto the respective sets of coordinates of elements, in which the plurality of geographic regions are expanded to extend into additional elements prior to the storage of the respective sets of coordinates and the region identifiers.

15 Claims, 5 Drawing Sheets

US 8,996,551 B2

MANAGING GEOGRAPHIC REGION INFORMATION

BACKGROUND

The use of portable electronic devices, such as cellular telephones, tablet computers, portable gaming systems, personal media players, and laptop computers, is rapidly increasing. Many of these portable electronic devices are equipped with global positioning system (GPS) devices that enable the locations of the portable electronic devices to be determined with a relatively high degree of accuracy. In addition, or alternatively, the locations of the portable electronic devices may be determined through identification of their Internet protocol (IP) addresses, which may, for instance, be assigned to the portable electronic devices by a wireless hotspot provider.

The identified locations of the portable electronic devices are often used to supply the portable electronic devices with information relevant to the identified locations. The relevant information comprises, for instance, information pertaining to landmarks or other structures of interest, advertisements, augmented reality, etc.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
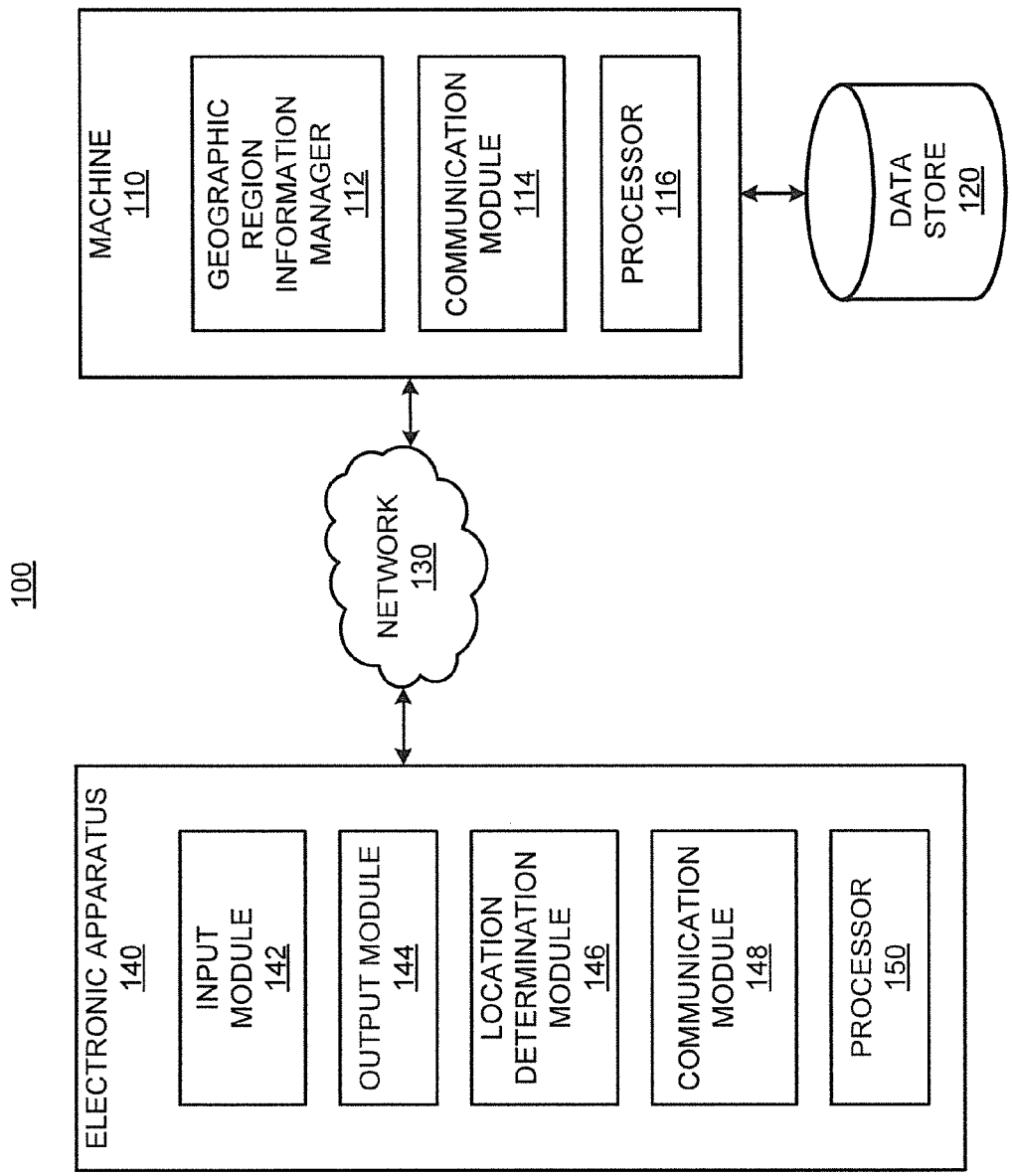
FIG. 1 illustrates a functional block diagram of an environment, in which a geographic region information manager disclosed herein may be implemented, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. The term "includes" means includes but not limited to, the term "including" means including but not limited to.

Disclosed herein is a method for managing geographic region information. Also disclosed herein are a machine for implementing the method and a non-transitory computer readable medium on which is stored machine readable instructions that implement the method. As discussed herein, a plurality of geographic regions that are identified by respective region identifiers are accessed, in which each of the plurality of geographic regions includes a boundary. The boundaries of the plurality of geographic regions are mapped onto a grid of elements, in which the boundary of each of the plurality of geographic regions is mapped to a respective set of elements. The boundaries of the plurality of geographic regions are expanded to extend into elements that are adjacent to the elements contained in the respective sets of elements. The coordinates of the elements onto which the expanded geographic regions are mapped are determined. In addition, the determined coordinates are stored in a database along with the region identifiers of their respectively correlated geographic regions.

Through implementation of aspects of the present disclosure, the coordinates of the elements onto which the expanded geographic regions are mapped and their region identifiers are stored in a database prior to the information contained in the database being accessed to determine a geographic region associated with an input location. As the coordinates of the geographic regions are readily available from the database, a relatively simple query may be performed on the database to determine which of the geographic regions are associated with, e.g., contain, a requested input location. In one regard, therefore, the amount of time required to determine a geographic region associated with an input location may be relatively short. In addition, the time to perform a query on the database and the storage space required for the database is substantially constant without regard to the number of geographic regions.

As also discussed herein, because the stored coordinates are of the elements onto which the expanded geographic regions are mapped, portions of the expanded geographic regions are likely to overlap each other and onto the same sets of coordinates and thus, a lookup may return multiple geographic regions. In this regard, false positives are more likely than false negatives. In addition, a subsequent query into the database may be avoided in instances where the input location is near the boundaries of overlapping geographic regions.

With reference first to FIG. 1, there is shown a functional block diagram of an environment 100, in which a geographic region information manager disclosed herein may be implemented, according to an example. It should be readily apparent that the diagram depicted in FIG. 1 represents a generalized illustration and that other components may be added or existing components may be removed, modified or rearranged without departing from a scope of the present disclosure.

The environment 100 is depicted as including a machine 110, a data store 120, a network 130, and an electronic apparatus 140. The machine 110, which may comprise a computer, a server, etc., is also depicted as including a geographic region information manager 112, a communication module 114, and a processor 116. The geographic region information manager 112 is to manage geographic region information, for instance, by storing source data entries into a database that identify, for instance, the geographic regions and the boundaries of the geographic regions. The information contained in the database may be used to determine in which of the plurality of geographic regions a particular input location falls. For instance, the entries in the database for each of the geographic regions may define all of the coordinates over which an expanded version of the geographic region is mapped. In one regard, the two dimensional coordinates of an input location may be used to query the database to identify in which of the geographic regions the input location falls. Various manners in which the geographic region information manager 112 may be implemented are described in greater detail herein below.

The communication module 114 comprises a hardware device, machine readable instructions, or a combination thereof to enable the machine 110 to receive and send data over the network 130. The network 130 may comprise an IP network, such as the Internet, a cellular network, a local area network, etc. According to an example, the communication module 114 may receive information pertaining to the input location of the electronic apparatus 140. In addition, or alternatively, the communication module 114 may output a geographic region associated with an input location. Furthermore, the communication module 114 may communicate information pertinent to the geographic region associated with the input location, which may comprise any of a targeted advertisement, information relating to the geographic region, augmented reality information, etc. In one example, the machine 110 may comprise a server of an internet service provider, a mobile application supplier, an advertising company, an augmented reality provider, etc.

The processor 116, which comprises a microprocessor, a micro-controller, an application specific integrated circuit (ASIC), or the like, is to perform various processing functions in the machine 110. For instance, the processor 116 is to implement the geographic region determination manager 112 and the communication module 114.

The electronic apparatus 140 may comprise any type of apparatus that is able to communicate with the machine 110 over the network 130. For instance, the electronic apparatus 140 may comprise any of a smart phone, a cellular telephone, a laptop computer, a personal media player, a portable gaming system, etc., or a device that performs multiple ones of these functions. The electronic apparatus 140 is depicted as including an input module 142, an output module 144, a location determination module 146, a communication module 148, and a processor 150.

The input module 142 comprises any of a touchscreen, a keyboard, a tactical input device, a microphone, etc., through which a user may input commands into the electronic apparatus 140. The output module 144 comprises any of a display, a speaker, etc., through which the electronic apparatus 140 may output data. The input module 142 and the output module 144 comprise hardware, software, or a combination thereof to enable the above-described input and output functions.

The location determination module 146 comprises a hardware device, machine readable instructions, or a combination thereof to enable a location of the electronic apparatus 140 to be determined. According to an example, the location determination module 146 comprises a global positioning system (GPS) receiver that is to calculate its position by timing signals sent by GPS satellites. In another example, the location determination module 146 comprises a terrestrial-based location determination system. In a further example, the location determination module 146 comprises components for determining an Internet Protocol (IP) address of the electronic apparatus 140, which may be used to determine a general location of the electronic apparatus 140.

The communication module 148 comprises a hardware device, machine readable instructions, or a combination thereof to enable the electronic apparatus 140 to receive and send data over the network 130. According to an example, the communication module 148 may communicate information pertaining to the location of the electronic apparatus 140. The information pertaining to the location of the electronic apparatus 140 may comprise a request for a geographic region associated with the current location of the electronic apparatus 140, the IP address of the electronic apparatus 140, etc. In addition, or alternatively, the communication module 148 may receive information pertaining to a geographic region associated with the location in which the electronic apparatus 140 is located. Furthermore, the communication module 148 may communicate information pertinent to the geographic region, which may comprise a targeted advertisement, information relating to the geographic region, etc.

The processor 150, which comprises a microprocessor, a micro-controller, an application specific integrated circuit (ASIC), or the like, is to perform various processing functions in the electronic apparatus 140. For instance, the processor 150 is to implement the modules 142-148 in the electronic apparatus 140.

Figure 2:
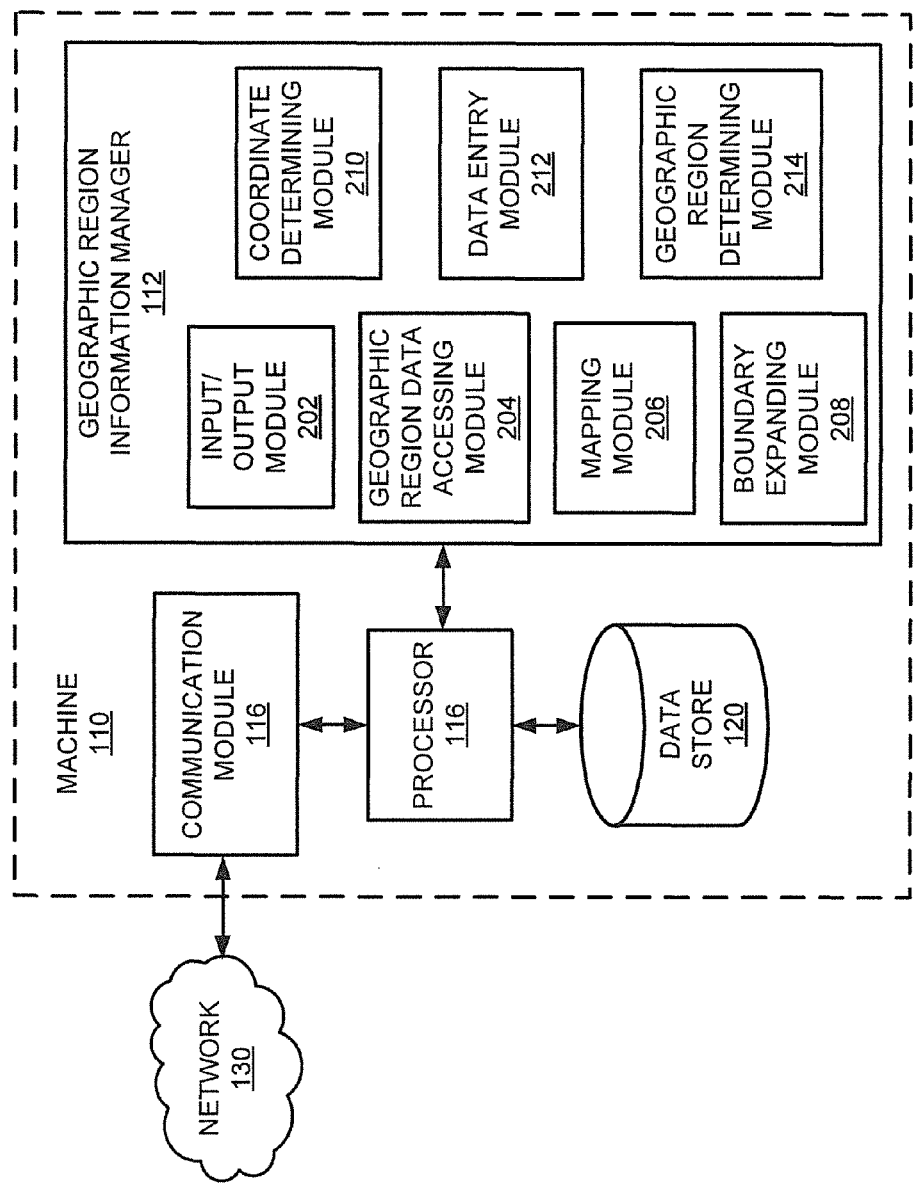
FIG. 2 shows a functional block diagram of the machine illustrated in FIG. 1, according to an example of the present disclosure.

Turning now to FIG. 2, there is shown a functional block diagram of the machine 110 illustrated in FIG. 1, according to an example. It should be understood that the machine 110 may include additional components and that some of the components described herein may be removed and/or modified without departing from the scope of the machine 110.

The machine 110 in FIG. 2 is depicted as including all of the same components as those in the machine 110 depicted in FIG. 1. One difference, however, is that the data store 120 in FIG. 2 is depicted as forming part of the machine 110. It should be understood that the data store 120 may form part of the machine 110 or may be a separate data store 120 without departing from a scope of the geographic region information manager 112 disclosed herein. In any regard, the data store 120 comprises volatile and/or non-volatile memory, such as DRAM, EEPROM, MRAM, phase change RAM (PCRAM), Memristor, flash memory, or the like. According to an example, the database into which the processor 116 is to store the determined coordinates of the elements onto which expanded geographic regions and region identifiers may be contained in the data store 120, and may be searchable through a suitable searching technique, such as a look up table, a search tree, etc.

In addition to the components of the machine 110 depicted in the diagram in FIG. 1, the geographic region information manager 112 is depicted as including an input/output module 202, a geographic region data accessing module 204, a mapping module 206, a boundary expanding module 208, a coordinate determining module 210, a data entry module 212, and a geographic region determining module 214. The processor 116 is to invoke or implement the modules 202-214 as discussed in greater detail herein below.

According to an example, the geographic region information manager 112 comprises machine readable instructions stored, for instance, in a volatile or non-volatile memory, such as DRAM, EEPROM, MRAM, flash memory, floppy disk, a CD-ROM, a DVD-ROM, or other optical or magnetic media, and the like. In this example, the modules 202-214 comprise modules of machine readable instructions stored in the memory, which are executable by the processor 116. According to another example, the geographic region information manager 112 comprises a hardware device, such as a circuit or multiple circuits arranged on a board. In this example, the modules 202-214 comprise circuit components or individual circuits, which the processor 116 is to control. According to a further example, the geographic region information manager 112 comprises a combination of modules with machine readable instructions and hardware modules.

Figure 3:
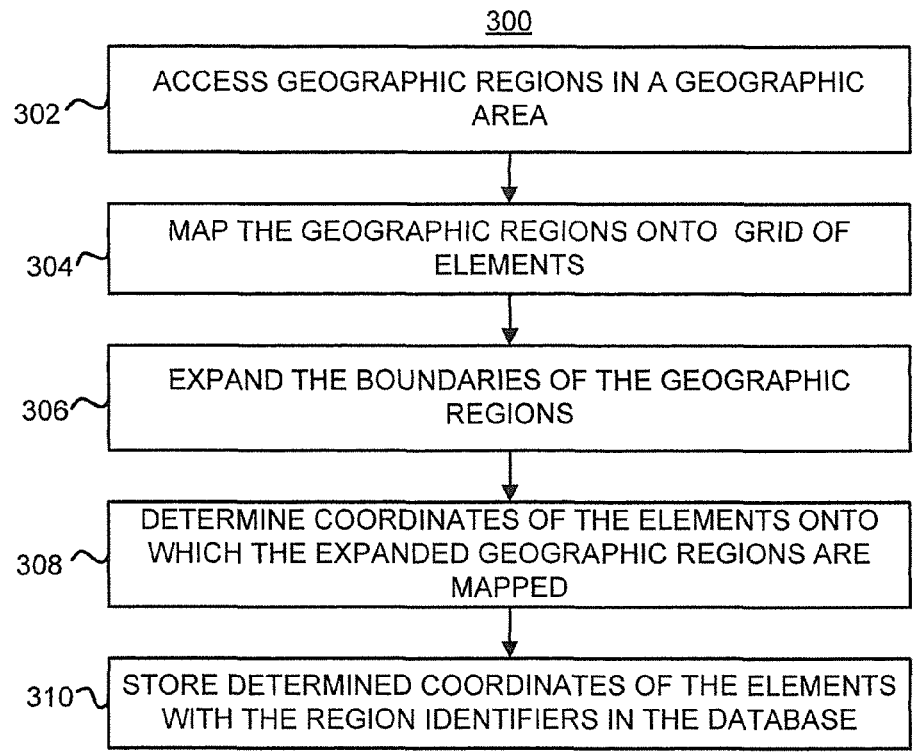
FIGS. 3 and 4, respectively, show flow diagrams of methods for managing geographic region information, according to examples of the present disclosure.
Figure 4:
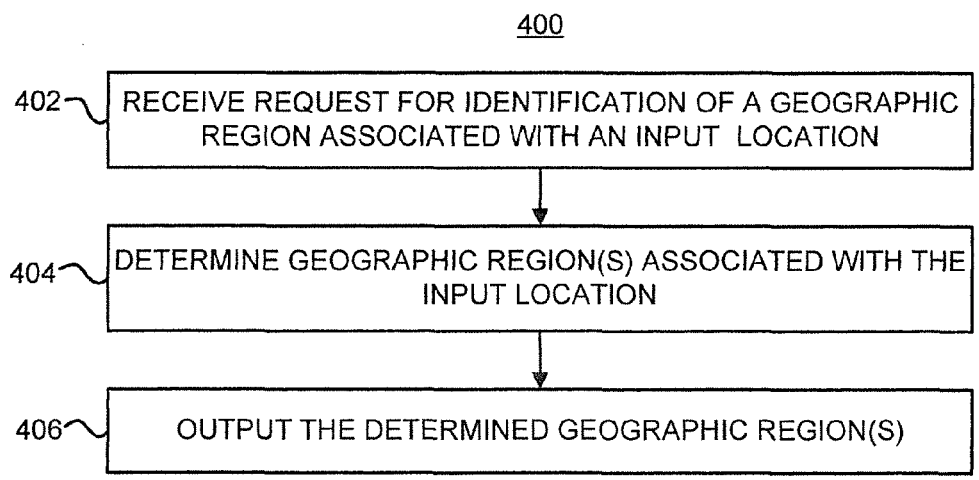

Various manners in which the modules 202-214 of the geographic region information manager 112 may operate are discussed with respect to the methods 300 and 400 respectively depicted in FIGS. 3 and 4. It should be readily apparent that the methods 300 and 400 represent generalized illustrations and that other elements may be added or existing elements may be removed, modified or rearranged without departing from the scopes of the methods 300 and 400.

With reference first to FIG. 3, there is shown a flow diagram of a method 300 for managing geographic region information, according to an example. At block 302, a plurality of geographic regions in a geographic area is accessed, for instance, by the geographic region accessing module 204. Particularly, the accessed geographic regions are identified by respective region identifiers and by respective boundaries, which may be found in shape data of the accessed geographic regions. According to an example, the boundaries of each of the plurality of geographic regions in the geographic area are formed of respective polygons. By way of particular example in which the geographic area is the entire world, each of the geographic regions comprises a different continent or country. Additional shape data of the geographic regions may also be accessed, in which the shape data identifies respective boundaries and sub-region identifiers of geographic sub-regions within the geographic regions. The geographic sub-regions may comprise counties, cities, etc., within the geographic regions. The shape data of additional sub-regions may further be accessed, for instance, neighborhoods, subdivisions, streets, buildings, etc.

In one example, the shape data of the geographic regions comprises shape data that is available from a third-party source, e.g., commercially available data. In another example, the shape data may be generated from a map, in which, the geographic regions within a geographic area are identified through use of hand-drawn and/or machine-drawn polygons that define the boundaries of the geographic regions. In any event, the shape data may be accessed either from a memory location, such as the data store 120, through the network 130, etc.

At block 304, the geographic regions, or the boundaries of the geographic regions, are mapped onto a grid of elements, for instance, by the mapping module 206. Particularly, the polygons that define the boundaries of each of the geographic regions are mapped, e.g., painted, onto the elements, e.g., pixels, through implementation of a suitable conventional polygon filling operation, such that the boundary of each of the plurality of geographic regions is mapped to a respective set of elements. The resolution of the elements may be selected based upon various factors including, any of the scale of the geographic regions, the accuracy at which the input locations of the electronic apparatus 140 may be determined, storage space requirements, the granularity at which the geographic regions are to be segregated from each other, etc. By way of particular example in which the geographic area comprises the entire world, the resolution may be approximately 0.1 degrees per element. As another example in which the geographic area comprises a single city, the resolution may be approximately 0.001 degrees or smaller per element.

At block 306, the boundaries of the geographic regions, or the geographic regions themselves, are expanded to extend into elements that are adjacent to the elements contained in the respective sets of elements, for instance, by the boundary expanding module 208. In one regard, the expansion of the boundaries may cause at least some of the neighboring geographic regions to at least partially overlap with each other. More detailed discussions of the mapping and expansion operations are provided below with respect to FIGS. 5A and 5B.

At block 308, coordinates of the elements onto which the plurality of geographic regions are expanded are determined, for instance, by the coordinate determining module 210. That is, for instance, elements in the grid of elements may have predetermined two-dimensional coordinate values with respect to each other and/or from a common vertex. The common vertex may comprise a particular location on Earth, such as a location on the equator, a location one of the poles, a location along a border between two countries, etc. In addition, the two-dimensional coordinate values of each of the elements upon which the expanded geographic regions are respectively mapped may be determined at block 308.

At block 310, the determined respective sets of coordinates of the elements upon which the plurality of expanded geographic regions are mapped and their correlated region identifiers are stored in a database, for instance, by the data entry module 212. Particularly, for instance, the sets of coordinates and the region identifiers to which the sets of coordinates are correlated are stored in the database in a manner that enables searches to be performed on the sets of coordinates to determine the correlated region identifiers. The database may comprise any suitable type of database that may be queried for the geographic location information. An example of a suitable database is a CouchDB. Other types of databases may also be used.

As discussed in greater detail herein below, the database may be queried to determine the geographic region(s) associated with a particular input location. The determined geographic region(s) may be returned to a user or used to supply information relevant to the determined geographic region to the user. In one regard, by storing the coordinates of the elements and the geographic regions correlated to the coordinates in the database prior to determining the geographic region(s) associated with the particular location, the time and processing required to determine the geographic region(s) may substantially be reduced as compared with operations that attempt to determine the geographic region(s) without the predetermined information contained in the database as disclosed herein.

According to an example, the method 300 is performed a plurality of times to generate entries of the coordinates of the elements to which the expanded geographic regions are mapped and the correlated region identifiers at different scales. For instance, the method 300 is performed to, in the database, generate and/or update the coordinates of the elements to which the expanded geographic regions are mapped and is performed again to generate and/or update the coordinates of the elements to which expanded geographic sub-regions are mapped. By way of particular example, the method 300 is performed to generate and/or update, in the database, the coordinates and region identifiers of a plurality of states and is performed again to generate and/or update, in the database, the coordinates and region identifiers of a plurality of counties in a state. As another particular example, the method 300 is performed to generate and/or update, in the database, the coordinates and region identifiers of a plurality of cities and is performed again to generate and/or update, in the database, the coordinates and region identifiers of a plurality of neighborhoods in a city.

Turning now to FIG. 4, there is shown a flow diagram of a method 400 for managing geographic region information, according to another example. The method 400 may be implemented following implementation of the method 300 to, for instance, respond to a request for a determination of the geographic location in which a requested location is contained.

At block 402, a request for identification of a geographic region associated with an input location is received, for instance, by the input/output module 202. The input location may comprise the location of the electronic apparatus 140 as determined, for instance, by the location determination module 146 of the electronic apparatus 140, and communicated through the network 130. In another example, the input location may comprise the location of the electronic apparatus 140 determined, for instance, based upon an IP address of the electronic apparatus 140.

At block 404, a determination of a geographic region(s) associated with the input location is made from the database, for instance, by the geographic region determining module 214. For instance, the input location is identified by a set of coordinates, such as a longitude coordinate and a latitude coordinate or a x and a y coordinate, and a search is performed on the database to determine which of the geographic region (s) correspond to an element having matching or nearly matching coordinate values. The region identifier(s) that correspond to the element may then be identified from the database. According to an example in which the resolution of the set of coordinates of the input location differs from the resolution of the coordinate values of the elements, the resolution of the set of coordinate values of the input location is rounded to be same as the resolution of the coordinate values of the elements prior to performing the search on the database at block 404. That is, for instance, the set of coordinate values of the input location may be rounded to have the same level of precision as the elements, e.g., the set of coordinate values of the input location may be taken to the same number of decimal points as the coordinate values of the elements.

As discussed herein, a plurality of expanded geographic regions may be mapped to a number of the same elements. As such, at block 404, a plurality of geographic regions may be determined to be associated with the input location. The plurality of geographic regions determined at block 404 may also be returned to the electronic apparatus 140 such that, if the electronic apparatus 140 is located at or near an intersection of the geographic regions, the relevant geographic regions may be determined and outputted during a single query and output operation.

In addition, a determination may be made at block 404 of an additional geographic region(s) that is within the geographic region(s) determined to be associated with the input location. In this example, the additional geographic region(s) may be a sub-region of the geographic region(s) determined to be associated with the input location. The determination of the geographic sub-region(s) may be made through performance of a query on the same database as discussed above or on a separate database containing coordinates of elements onto which the expanded geographic sub-regions are mapped correlated with sub-region identifiers of the geographic sub-region(s). According to an example, the coordinates of the elements onto which the expanded geographic sub-regions are mapped are stored in the same database and at the same resolution as the coordinates of the elements onto which the expanded geographic regions are stored. In this example, the geographic region(s) and the geographic sub-region(s) associated with the input location may be determined through a signal query.

At block 406, the determined geographic region(s), and in certain instances, the determined geographic sub-region(s), is outputted, for instance, by the input/output module 202. In one example, the determined geographic region(s) is communicated to the electronic apparatus 140. In another example, the determined geographic region(s) are communicated to a location in which the determined geographic region(s) are used to determine content, such as an advertisement, information, etc., to be delivered to the electronic apparatus 140. The location may be internal to the geographic region information manager 112, i.e., another module that is to perform this function, or the location may be external to the geographic region information manager 112, i.e., another manager or machine that is to perform this function.

Figure 5A:
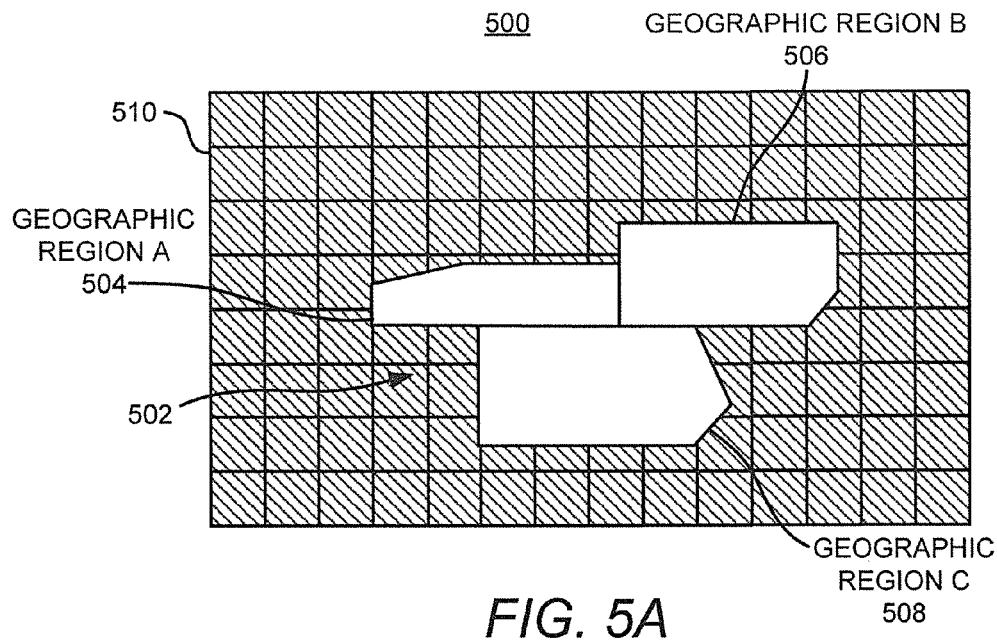
FIGS. 5A and 5B illustrate block diagrams that depict a manner in which a plurality of geographic regions are mapped onto elements and expanded, according to an example of the present disclosure.
Figure 5B:
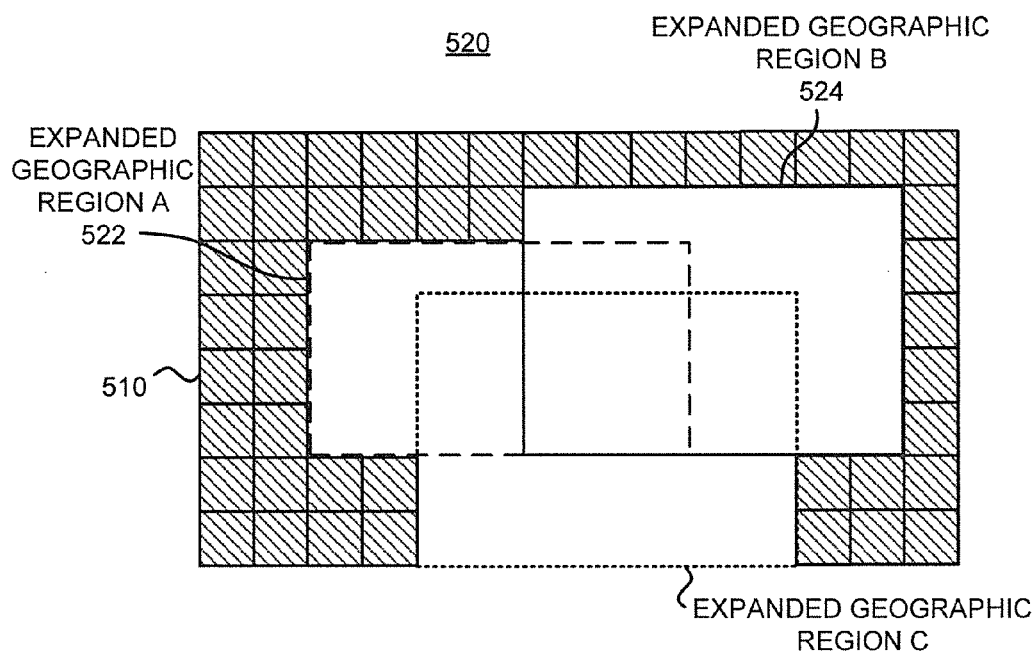

Turning now to FIGS. 5A and 5B, there are shown block diagrams 500 and 520 that together illustrate a manner in which a plurality of geographic regions are mapped onto a grid of elements and expanded to extend the boundaries of the geographic regions, according to an example. Particularly, block diagram 500 illustrates a manner in which block 304 in FIG. 3 may be performed and block diagram 520 illustrates a manner in which block 306 in FIG. 3 may be performed. It should be readily apparent that the diagrams depicted in FIGS. 5A and 5B represent generalized illustrations and that other components may be added or existing components may be removed, modified or rearranged without departing from a scope of the present disclosure.

With reference first to FIG. 5A, a geographic area 502 is depicted as including a first geographic region 504, a second geographic region 506, and a third geographic region 508. The geographic regions 504-508 are also depicted as being mapped onto a grid of elements 510 (or pixels) having a predefined resolution, i.e., height and width. The elements 510 are assigned respective coordinate values, for instance, from a common origin vertex. The elements 510 have the same resolution with respect to each other and the resolution may be selected based upon any of a number of factors as discussed above. The elements 510 have been shaded to distinguish the geographic regions 504-508 from the elements 510.

As shown in FIG. 5A, and as discussed above with respect to block 304 in FIG. 3, the geographic regions 504-508 are mapped to respective sets of elements 510. As shown in FIG. 5B, and as discussed above with respect to block 306 in FIG. 3, the boundaries of the geographic regions 504-508 are expanded to extend into elements 510 that are adjacent to the elements 510 contained in the respective sets of elements 510. Particularly, as shown in FIG. 5B, the boundaries of each of the geographic regions 504-508 are expanded to not only encompass the elements 510 onto which the geographic regions are mapped as shown in FIG. 5A, but also to encompass the adjacent elements 510. In FIG. 5B, the expanded first geographic region 522 is depicted with dashed lines, the expanded second geographic region 524 is depicted with solid lines, and the expanded third geographic region 526 is depicted with dotted lines. The expanded geographic regions 522-526 depicted in FIG. 5B are thus mapped onto much larger sections of the elements 510 as compared with the geographic regions 504-508 depicted in FIG. 5A. In addition, the expanded geographic regions 522-526 contain sections that overlap each other.

As also discussed above with respect to FIG. 3, the coordinates of the elements 510 onto which each of the expanded geographic regions 522, 524, and 526 are mapped may be determined (block 308) and stored (block 310) in the database. The coordinates the elements 510 onto which each of the expanded geographic regions 522, 524, and 526 are mapped may be determined through implementation of a conventional scanning operation.

Some or all of the operations set forth in the methods 300 and 400 may be contained as utilities, programs, or subprograms, in any desired computer accessible medium. In addition, the methods 300 and 400 may be embodied by computer programs, which can exist in a variety of forms both active and inactive. For example, they may exist as software program(s) comprised of program instructions in source code, object code, executable code or other formats. Any of the above may be embodied on a computer readable storage medium.

Example computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 6:
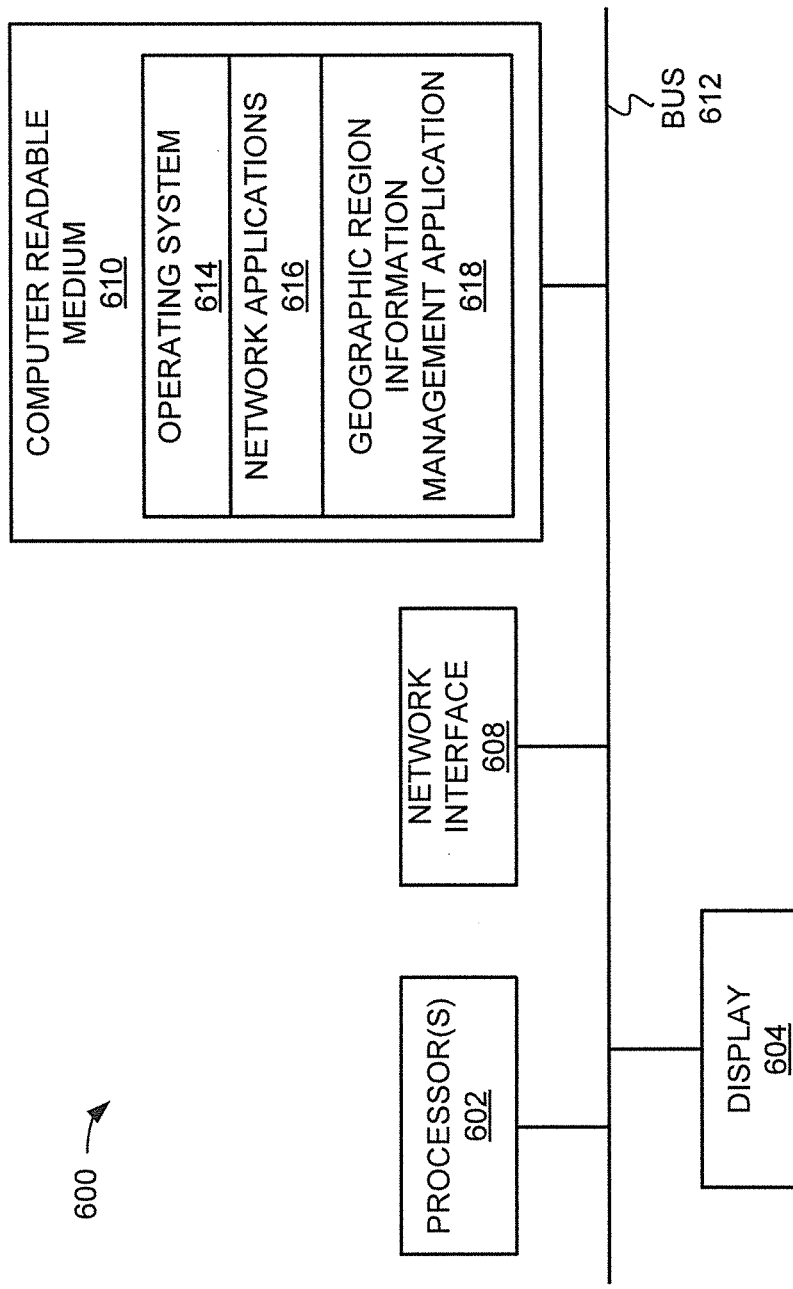
FIG. 6 illustrates a block diagram of a computing device to implement the methods depicted in FIGS. 3 and 4, according to example of the present disclosure.

Turning now to FIG. 6, there is shown a block diagram of a computing device 600 to implement the methods depicted in FIGS. 3 and 4, in accordance with examples of the present disclosure. The device 600 includes a processor 602, such as a central processing unit; a display device 604, such as a monitor; a network interface 608, such as a Local Area Network LAN, a wireless 802.11x LAN, a 3G mobile WAN or a WiMax WAN; and a computer-readable medium 610. Each of these components is operatively coupled to a bus 612. For example, the bus 612 may be an EISA, a PCI, a USB, a FireWire, a NuBus, or a PDS.

The computer readable medium 610 may be any suitable non-transitory medium that participates in providing instructions to the processor 602 for execution. For example, the computer readable medium 610 may be non-volatile media, such as an optical or a magnetic disk; volatile media, such as memory; and transmission media, such as coaxial cables, copper wire, and fiber optics.

The computer-readable medium 610 may also store an operating system 614, such as Mac OS, MS Windows, Unix, or Linux; network applications 616; and a geographic region information management application 618. The network applications 616 include various components for establishing and maintaining network connections, such as machine readable instructions for implementing communication protocols including TCP/IP, HTTP, Ethernet, USB, and FireWire.

The geographic region information management application 618 provides various components for managing geographic region information, as described above. The management application 618 may thus comprise the geographic region information manager 112 discussed above. In this regard, the management application 618 may include the modules 202-214, which are also discussed above. In certain examples, some or all of the processes performed by the application 618 may be integrated into the operating system 614. In certain examples, the processes may be at least partially implemented in digital electronic circuitry, or in computer hardware, machine readable instructions (including firmware and/or software), or in any combination thereof.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for managing geographic region information, said method comprising:

accessing a plurality of geographic regions that are identified by respective region identifiers, wherein each of the plurality of geographic regions includes a boundary;

mapping the boundaries of the plurality of geographic regions onto a grid of elements, wherein the boundary of each of the plurality of geographic regions is mapped to a respective set of elements, and wherein each element has a set of coordinates relative to a particular location on Earth;

expanding the boundaries of the plurality of geographic regions to extend into elements that are adjacent to the elements contained in the respective sets of elements;

determining respective sets of coordinates of the elements onto which the plurality of geographic regions are expanded; and storing, by a processor, the determined respective sets of coordinates of the elements and the region identifiers of the plurality of geographic regions that are mapped onto the respective sets of coordinates in a database.

2. The method according to claim 1, wherein determining the respective sets of coordinates of the elements further comprises, for each of the plurality of expanded geographic regions, determining the coordinates of each of the elements onto which the expanded geographic region is mapped, and wherein storing the respective sets of coordinates of the elements further comprises storing the coordinates of each of the elements onto which the plurality of expanded geographic regions are mapped.

3. The method according to claim 1, wherein expanding the boundaries of the plurality of geographic regions further comprises expanding the boundaries of the plurality of geographic regions to cause a plurality of the geographic regions to at least partially overlap each other some of the elements.

4. The method according to claim 1, further comprising:
accessing a plurality of geographic sub-regions within the plurality of geographic regions, wherein each of the plurality of geographic sub-regions includes a boundary and it is identified by a respective sub-region identifier;

mapping the boundaries of the plurality of geographic sub-regions onto another grid of elements, wherein the elements in the another grid of elements have a resolution that is smaller than the resolution of the elements in the grid of elements, wherein the boundary of each of the plurality of geographic sub-regions is mapped to a respective set of elements and the another grid of elements;

expanding the boundaries of the plurality of geographic sub-regions to extend into elements that are adjacent to the elements contained in the respective sets of elements in the another grid of elements;

determining respective sets of coordinates of the elements in the another grid of elements onto which the plurality of geographic sub-regions are expanded; and storing, in the database, the respective sets of coordinates of the elements in the another grid of elements and the sub-region identifiers of the plurality of geographic sub-regions that are mapped onto the respective sets of coordinates.

5. The method according to claim 1, further comprising:
receiving a request for identification of a geographic region associated with an input location; and determining, from the database, a geographic region associated with the input location.

6. The method according to claim 5, wherein the input location comprises a pair of coordinate values and wherein determining the geographic region associated with the input location further comprises performing a query in the database for sets of coordinates that match the pair of coordinate values of the input location.

7. The method according to claim 6, wherein the elements have a predefined resolution, said method further comprising:
rounding the pair of coordinate values of the input location to the predefined resolution; and
wherein determining the geographic region associated with the input location further comprises determining the geographic region through implementation of a query in the database for the rounded coordinate values.

8. The method according to claim 5, further comprising:
outputting the determined geographic region associated with the requested location.

9. The method according to claim 1, further comprising:
receiving a request for identification of a geographic region associated with an input location;
determining, from the database, a plurality of geographic regions associated with the input location; and
outputting the determined plurality of geographic regions associated with the requested location.

10. A machine for managing geographic region information, said machine comprising:
a memory storing machine readable instructions to:
access a plurality of geographic regions that are identified by respective region identifiers, wherein each of the plurality of geographic regions includes a boundary;
map the boundaries of the plurality of geographic regions onto a grid of elements, wherein the boundary of each of the plurality of geographic regions is mapped to a respective set of elements, and wherein each element has a set of coordinates relative to a particular location on Earth;
expand the boundaries of the plurality of geographic regions to extend into elements that are adjacent to the elements contained in the respective sets of elements to thereby cause boundaries of at least two of the plurality of expanded geographic regions to at least partially overlap each other;
determine respective sets of coordinates of the elements onto which the plurality of geographic regions are expanded; and
store the determined respective sets of coordinates of the elements and the region identifiers of the plurality of geographic regions that are mapped onto the respective sets of coordinates in a database; and
a processor to implement the machine readable instructions.

11. The machine according to claim 10, wherein the machine readable instructions are further to:
determine, for each of the plurality of expanded geographic regions, the coordinates of each of the elements onto which the expanded geographic region is mapped; and
store, in the database, the coordinates of each of the elements onto which the plurality of expanded geographic regions are mapped.

12. The machine according to claim 10, wherein the machine readable instructions are further to:
access a plurality of geographic sub-regions within the plurality of geographic regions, wherein each of the plurality of geographic sub-regions includes a boundary and it is identified by a respective sub-region identifier;
map the boundaries of the plurality of geographic sub-regions onto another grid of elements, wherein the elements in the another grid of elements have a resolution that is smaller than the resolution of the elements in the grid of elements, wherein the boundary of each of the plurality of geographic sub-regions is mapped to a respective set of elements and the another grid of elements;
expand the boundaries of the plurality of geographic sub-regions to extend into elements that are adjacent to the elements contained in the respective sets of elements in the another grid of elements;
determine respective sets of coordinates of the elements in the another grid of elements onto which the plurality of geographic sub-regions are expanded; and
store, in the database, the respective sets of coordinates of the elements in the another grid of elements and the sub-region identifiers of the plurality of geographic sub-regions that are mapped onto the respective sets of coordinates.

13. The machine according to claim 10, wherein the machine readable instructions are further to:
receive a request for identification of a geographic region associated with an input location, wherein the input location comprises a pair of coordinate values; and
determining, from the database, a geographic region associated with the input location.

14. The machine according to claim 13, wherein the elements have a predefined resolution, and wherein the machine readable instructions are further to:
round the pair of coordinate values of the input location to the predefined resolution; and
determine the geographic region through implementation of a query in the database for the rounded coordinate values.

15. A non-transitory computer readable storage medium on which is stored machine readable instructions that when executed by a processor, implement a method for managing geographic region information, said machine readable instructions comprising code to:
access a plurality of geographic regions that are identified by respective region identifiers;
map the plurality of geographic regions onto a grid of elements, wherein each of the plurality of geographic regions is mapped to a respective set of elements, and wherein each element has a set of coordinates relative to a particular location on Earth;
expand the plurality of geographic regions to extend into elements that are adjacent to the elements contained in the respective sets of elements;
determine respective sets of coordinates of the elements onto which the plurality of geographic regions are expanded; and
store the determined respective sets of coordinates of the elements and the region identifiers of the plurality of geographic regions that are mapped onto the respective sets of coordinates in a database.

* * * * *